Sept. 26, 1961   W. STELZER   3,001,831
TRACTOR-TRAILER BRAKE SYSTEM
Filed Aug. 26, 1959
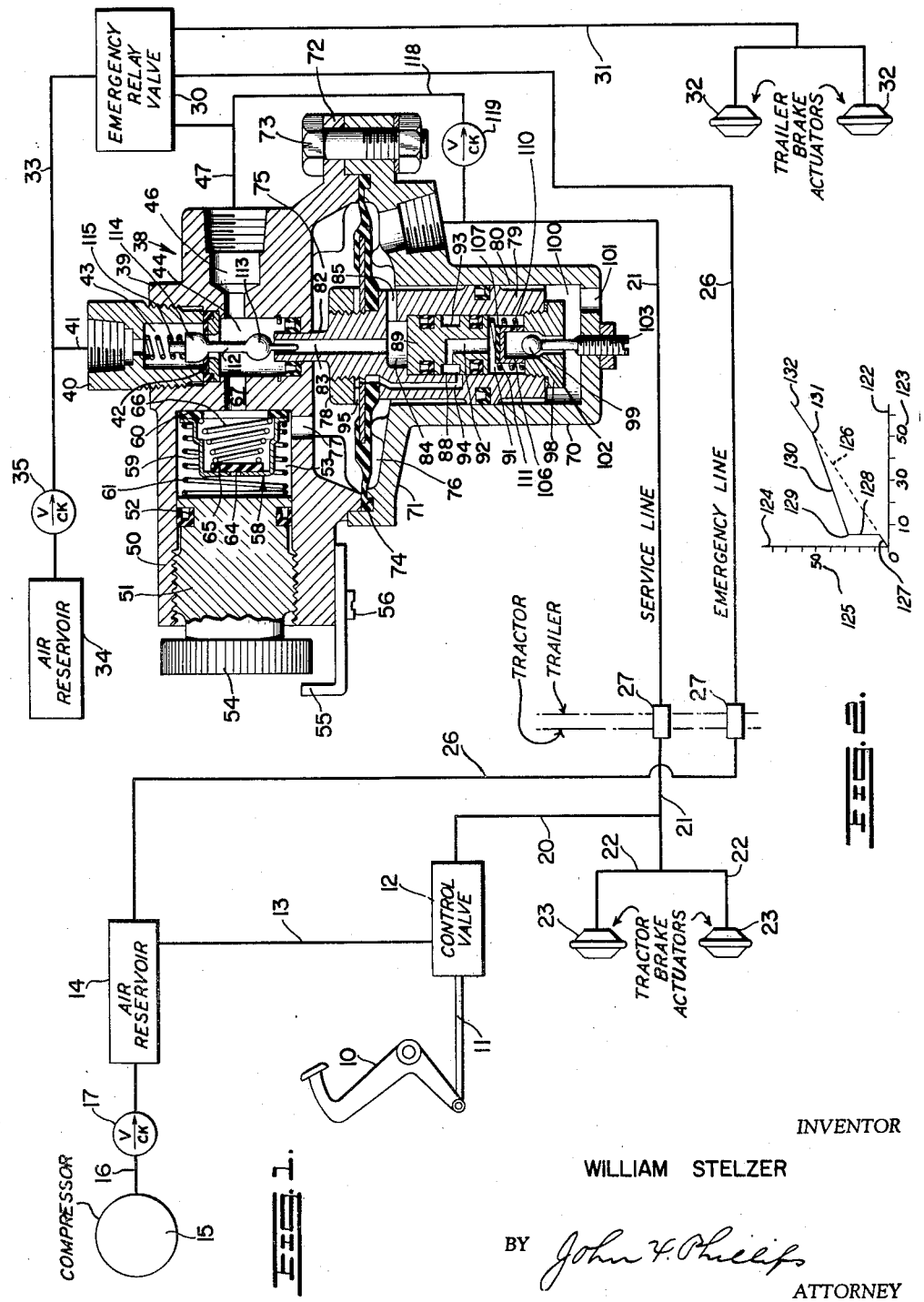
INVENTOR
WILLIAM STELZER
BY *John F. Phillips*
ATTORNEY

United States Patent Office 3,001,831
Patented Sept. 26, 1961

3,001,831
TRACTOR-TRAILER BRAKE SYSTEM
William Stelzer, Bloomfield Hills, Mich., assignor to Kelsey-Hayes Company, Detroit, Mich., a corporation of Delaware
Filed Aug. 26, 1959, Ser. No. 836,109
19 Claims. (Cl. 303—7)

This invention relates to a tractor-trailer brake system.

In a conventional tractor-trailer brake system, it is the common practice to control the operation of the trailer brake actuators in accordance with pressure impulses passing through a service line incident to operation of the truck brake pedal. Due to the fact that an appreciable interval of time is necessary for the pressure impulses in the service line to reach and affect the trailer relay valve, the application of the trailer brakes lags behind the application of the truck brakes, as is well known. Such operation is highly disadvantageous since it often results in "jackknifing" due to the relatively heavy application of the tractor brakes ahead of the trailer brakes. Moreover, it is the common practice to provide the truck with a hand valve for controlling the trailer brakes so that the operator can snub the trailer brakes, when desired, or initiate the operation of the trailer brakes when the truck brakes are to be applied, to insure initial operation of the trailer brakes ahead of the truck brakes.

An important object of the present invention is to provide a system of the character described having a novel type of auxiliary control valve mechanism arranged in the service line, which is operated by relatively light pressure impulses in the service line to effect the operation of the trailer brakes at least as early as the operation of the tractor brakes.

A further object is to provide such a system wherein the auxiliary valve is interposed in the service line on the trailer ahead of the relay valve and which functions under the influence of light pressure impulses to connect the trailer air reservoir to the relay valve to effect operation of the latter to cause an application of the trailer brakes proportionately to a much greater extent than normally would occur through the relatively light impulse in the service line.

A further object is to provide such a system wherein, upon the building-up of pressure in the service line incident to operation of the tractor brake actuators, the pressure in the service line takes over the controlling of the trailer relay valve at a predetermined point in the brake operation to establish and maintain trailer brake operation proportionate to tractor brake operation.

A further object is to provide in a system of the character referred to an auxiliary valve of the relay type connected in the service line ahead of the trailer relay or emergency valve and which so functions that, upon the admission of relatively low pressures to the forward end of the service line, the outgoing controlled pressure to the trailer relay or emergency valve is first rapidly raised to a certain level, after which such pressure is increased but at a gradually decreasing rate until the controlling pressure in the forward end of the service line catches up with the outgoing controlled pressure supplied to the trailer relay or emergency valve so that both pressures are the same, after which the pressures in the forward and rear ends of the service line assume a 1:1 ratio so that the trailer brakes are applied to a degree proportional to the application of the tractor brakes.

A further object is to provide a system of this character wherein the auxiliary valve is so highly sensitive to light pressure impulses in the service line that initial pedal brake operation, to an extent below that required for an appreciable application of the tractor brakes, will result in an application of the trailer brakes to provide a snubbing operation without the necessity of having to use a conventional hand valve.

A further object is to provide such a system wherein no additional lines need be connected between the truck and trailer, only the conventional service and emergency lines being employed.

A further object is to provide an auxiliary valve of the type referred to which is adjustable to provide an increased or decreased trailer brake snubbing action in accordance with the loading of the trailer.

A further object is to provide an auxiliary valve having novel means for effecting a very rapid releasing of the trailer brakes when the latter have been operated to snub the trailer brakes.

Other objects and advantages of the invention will become apparent during the course of the following description.

In the drawing I have shown one embodiment of the invention. In this showing:

FIGURE 1 is a diagrammatic view of the tractor-trailer brake system, the auxiliary valve mechanism being structurally shown in section, and FIGURE 2 is a small diagrammatic view showing the relative pressures in the forward and rear ends of the service line at different stages of trailer brake application.

Referring to the drawing, the numeral 10 designates the truck brake pedal connected as at 11 to a suitable control valve 12 to which super-atmospheric pressure is supplied through a line 13 from a reservoir 14 mounted on the truck. A compressor 15 supplies compressed air to the reservoir 14 through a line 16 in which is arranged a check valve 17.

A line 20 leads from the control valve 12 to a service line 21 the forward end of which is branched as at 22 for connection to the truck brake actuators 23. The control valve 12 may be of any desired follow-up construction, and it will be apparent that operation of the brake pedal 10 disconnects the line 20 from the atmosphere and connects it to the line 13 to supply air pressure to the actuators 23 to apply the truck brakes.

An emergency line 26 is connected at its forward end to the reservoir 14 and extends rearwardly to the trailer, as is also true, of course, of the service line 21. The usual couplings 27 are provided in the lines 21 and 26 between the tractor and trailer.

The emergency line 26 connects to an emergency relay valve 30 of conventional type having a fluid line 31 leading to the trailer brake actuators 32. Air pressure is supplied to the valve 30 through a line 33 connected to a trailer air reservoir 34 and having a check valve 35 therein.

The auxiliary valve mechanism forming the principal subject matter of the present invention is indicated as a whole by the numeral 38 and comprises an upper body 39 tapped to receive a plug 40 connected by a line 41 to the pressure line 33.

The plug 40 fixes in position at its lower end a resilient valve seat 42 dividing a chamber 43 in the plug 40 from a chamber 44 in the body 39. The chamber 44 communicates through a port 46 with a line 47 leading to the relay valve 30, and it will become apparent that pressure in the line 47 operates the relay valve 30 to supply air pressure from the line 33 to the line 31.

The body 39 is provided opposite the port 46 with an extension 50 in which is threaded an adjusting plug 51 sealed as at 52 in a cylindrical chamber 53 formed in the extension 50. The plug 51 is provided at its outer end with a rotatable adjusting knob 54 engageable with a stop 55 to limit its outward movement for a purpose to be described. The stop 55 is fixed as at 56 to the extension 50.

A two-way check valve is arranged in the chamber 50 and is indicated as a whole by the numeral 58. This valve is similar to and may be identical with a conventional residual pressure valve employed in hydraulic brake systems. The valve 58 comprises a shell 59 having a valve 60 normally seating against the inner end wall of the chamber 53 and biased to closed position by a spring 61. The shell 59 is provided in its end with a port 64 normally closed by a valve 65 biased to closed position by a spring 66. The inner end wall of the chamber 53 is provided with a port 67 leading from the chamber 44 to the interior of the shell 59.

The body 39 carries a lower body 70 flanged as at 71 and secured to a similar flange 72 formed on the bottom of the body 39, these flanges being secured together as at 73. The flanges 71 and 72 clamp therebetween a circular diaphragm 74 dividing an upper chamber 75 in the body 39 from a lower chamber 76 formed in the body 70. The chambers 53 and 75 communicate through a port 77.

The diaphragm 74 is fixed by a nut 78 to a piston body 79 slidable in a cylinder 80 formed in the bottom portion of the body 70. The piston 79 has an axial extension 82 projecting into the chamber 44 in sealed relation to the body 39. Through the upper end of the piston 79 is formed a passage 83 the upper end of which forms a valve seat normally opening into the chamber 44 and the lower end of which communicates with a chamber 84 within the piston 79. The chamber 84 communicates through a passage 85 with the chamber 76.

The piston 79 is provided with a bore 88 in which is slidable a plunger 89 open to pressure in the chamber 84. The lower end of the bore 88 forms a chamber 91 communicating through a passage 92 in the plunger 89 with a groove 93 around the plunger 89, which groove communicates in turn with a passage 94 formed in the piston 79 and opening at its upper end into the chamber 75 through suitable passage means 95 formed in the nut 78.

A plug 98 is threaded into the bottom of the piston 79 and is provided with an axial valve seat 99 opening at its lower end into a chamber 100 in the bottom of the body 70, which chamber is open to the atmosphere as at 101. A ball valve 102 is adapted to engage the seat 99 and, under certain conditions to be described, this valve is held open by a stem 103 threaded in the bottom of the body 70.

An inverted cup 106 has its lower end seating on the plug 98 and is provided at its upper end with a valve 107 adapted to engage the lower end of the plunger 89 to close the passage 92. The cup 106 has its side wall apertured as at 110 to connect the chamber 91 to the passage leading through the valve seat 99. A spring 111 in the chamber 91 engages at its lower end with the plug 98 and at its upper end with the plunger 89 to bias the latter to its uppermost position shown in the drawing.

A stem 112 carries at its lower end an exhaust valve 113 normally disengaged from the upper end of the passage 83, and carries at its upper end an inlet valve 114 normally engaged with the valve seat 42. A spring 115, in the chamber 43, biases downwardly the stem 112 and the valves carried thereby.

For a reason referred to below, it is desired at a certain stage of brake operation to connect the service line 21 to the line 47. This connection is provided through the medium of a line 118 having interposed therein a check valve 119.

It will be apparent that the lines 21 and 47 constitute a control line and that the relay device is interposed in said control line to divide it into a primary control line 21 and a secondary control line 47. As pointed out below, controlling pressures are applied to the primary control line 21 to control pressures in the secondary control line 47 through the functioning of the relay valve mechanism.

In FIGURE 2, there is diagrammatically illustrated a graph showing the application of pressures to the relay valve 30 with and without the present invention. The axis of abscissas 122 is calibrated as at 123 to indicate p.s.i. in the control line 21 from the tractor. The axis of ordinates 124 is calibrated as at 125 to indicate p.s.i. in the line 47 leading to the relay valve 30. The dotted line 126 represents the progressive and uniform increase in pressures in the line 47 in accordance with progressively increasing pressures in the line 21. With the present invention, this line momentarily is followed as at 127 upon the first increment of movement of the brake pedal 10, whereupon the pressure in the line 47 rapidly increases as at 128 up to a predetermined point 129, after which the pressure in the line 47 continues to increase as at 130, but at a much slower rate, until the point 131 is reached. At this point, pressures in the lines 21 and 47 reach a 1:1 ratio, after which pressure in the line 47 increases proportionately to pressure in the line 21, as at 132. Beyond the point 131, the pressure in the line 121 relative to pressure in the line 47 maintains a 1:1 ratio throughout the remainder of trailer brake application. Beyond the point 131, therefore, the trailer brake actuators 32 will be energized proportionately to the tractor brake actuators 23.

*Operation*

The parts normally occupy the positions shown in the drawing. Assuming that the operator desires merely to snub the trailer brakes, he will slightly depress the brake pedal 10 to operate the control valve 12 and thus admit air at relatively low pressure to the lines 20, 21 and 22. This pressure, supplied to the actuators 23, will be insufficient to effect any appreciable application of the tractor brakes. Such slight pressure, however, acting through the service or primary control line 21, will be supplied to the chamber 76 of the auxiliary valve to move the diaphragm 74 upwardly. This operation moves the piston 79 upwardly to first close the valve 102, then engage the upper end of the extension 82 with the valve 113 to close such valve, and then open the valve 114. It will be apparent that the passage 83 is connected to the chamber 76 and normally communicates with the chamber 44. Upon the closing of the valve 113, the chamber 44 will be disconnected from the chamber 76.

The opening of the valve 114 connects the air reservoir 34 to the chamber 44 and thus supplies pressure through the secondary control line 47 to the relay valve 30 to operate the latter and supply brake applying pressure through the line 31 to the trailer brake actuators 32. Since the pressure supplied to the line 31 through the conventional relay valve 30 is proportional to pressure supplied through the pipe 47, and since such pressure will be substantially higher than the service line pressure supplied to the chamber 76, an appreciable application of the trailer brakes will occur.

When pressure in the chamber 44 increases to a predetermined point, the valve 60 will open to relieve pressure through the port 67 into the chamber 53 and thence through port 77 into the chamber 75 to subject the upper face of the diaphragm 74 to a pressure opposing pressure in the chamber 76. At a predetermined pressure in the chamber 75, the diaphragm 74 will move downwardly together with the piston 79 to lower the extension 82 and thus permit the valve 114 to close to stop the admission of pressure into the chamber 44.

The pressure supplied to the line 47 to effect the operation of the relay valve 30 which, in turn, determines the degree of application of the trailer brakes, is determined by the pressure at which the valve 60 opens. Such pressure, in turn, is determined by the loading of the spring 61 in accordance with the adjustment of the plug 51, as further referred to below. Due to the pressure drop caused by the relief valve 60, the pressure in the chamber 75 will be lower than pressure in the chamber 44. The pressure in the chamber 75 at which the diaphragm 74 is pushed downwardly thus depends on the loading of the spring 61, the air pressure existing in the chamber 44 and the air pressure in the chamber 76. Accordingly, increased air pressure in the chamber 76 causes the diaphragm 74 to resist yielding to pressure in the chamber 75 so that a higher pressure is produced in the chamber 44. It follows that pressure in the chamber 44 is increased with an increase in pressure in the chamber 76, as when the operator depresses the brake pedal to a further extent, as referred to below.

Since the presence of the piston 79 reduces the area of the lower face of the diaphragm 74 so that such area is smaller than the area of the upper face of the diaphragm 74 exposed to the chamber 75, it follows that at higher pressures the diaphragm 74 is eventually forced downwardly even though the pressure in the chamber 75 is lower than in the chamber 76. Such operation takes place at later brake applying stages, as referred to below.

Assuming that merely a snubbing operation has taken place, as described, and the operator releases the brake pedal, the service line 21 will be connected to the atmosphere through the control valve 12, thus dropping pressure in the chamber 76. Pressure then present in the chamber 75 will move the diaphragm 74 and piston 79 downwardly to open the valve 102, whereupon pressure in the chamber 75 will be vented through the groove 95, passage 94, groove 93, passage 92, chamber 91, vent 110 and to the atmosphere around the ball valve 102, chamber 100 and vent 101. The operation referred to lowers the piston 79 and opens the valve 113, whereupon pressure in the chamber 44 will be vented through passage 83, chamber 84, port 85 and chamber 76 into the service line 21, which is now open to the atmosphere. The device thereby provides for a highly efficient substantial snubbing action of the trailer brakes upon a slight increase in pressure in the service line. The device also functions as just described to quickly relieve pressures from the auxiliary valve mechanism and associated elements for a quick releasing of the trailer brakes.

Assuming that a heavier brake application is desired, the pedal is operated as before and the initial operation of the brake pedal results in an extremely rapid supply of pressure fluid to the trailer brake actuators, the functioning of the auxiliary valve mechanism, as described above, providing for a substantial trailer brake application ahead of substantial tractor brake application. Assuming that the relay valve has been operated as before and a pressure built up in the service line continues to increase pressure in the chamber 76, such pressure acting through port 85 and in chamber 84 moves the plunger 89 downwardly to engage the lower end of such plunger with the valve 107. This operation disconnects the passage 92 from the chamber 91 and thus prevents loss of pressure from the chamber 75 in a later stage of operation in which the valve 102 is opened, as described below.

In such operation, the increased pressure in the chamber 44 will be communicated as before to the chamber 75 to act downwardly on the diaphragm 74. When pressure in the chamber 75 reaches a predetermined point relative to pressure in the chamber 76, it is desired to have service line pressures take over the controlling of the relay valve. The increased pressures in the chamber 75, when they overcome pressure in the chamber 76, move the piston 79 downwardly to its normal position shown in the drawing, and such action opens the valve 102. The valve 107 will have been closed, however, thus trapping pressure in the chamber 75.

When the piston 79 reaches its lowermost position, the valve 114 will close and the valve 113 will open. Service line pressures will now flow from the chamber 76 through passage 85 into chamber 84, thence through passage 83 into the chamber 44 and thus to the relay valve 30 through the line 47. The auxiliary valve of the present invention then becomes inoperative, and there is a direct connection between the service line 21 and line 47 to the relay valve 30. Such valve then functions conventionally to apply the trailer brakes to an extent proportional to the application of the tractor brakes.

When pressure in the chamber 44 reaches the point where pressure in the chamber 75 moves the diaphragm 74 downwardly to allow the valves 113 and 114 to assume lap positions, there is a tendency for the parts momentarily to dwell in such position due to the tendency of the spring 61 to maintain the valve 60 closed. Such undesirable operation is prevented by the check valved bypass line 118. When pressure in the line 21 very slightly exceeds pressure which has been supplied through the line 47 to the valve 30, pressure will be released past check valve 119 into the line 118 to the relay valve 30, and such pressure also raises the pressure in the chamber 44 slightly to unseat the valve 60 and thus raise pressure in the chamber 75 to definitely move the diaphragm 74 downwardly to unseat the valve 113. At this point, the check valve 119 is no longer needed and will close, and pressure fluid will flow freely through passages 85 and 83 into chamber 44 and thus through line 47. Accordingly, any lagging in the operation of the device at the point indicated is prevented.

Attention is invited to the graph in FIGURE 2 which indicates in a general way the operation so far as pressure amplification through the line 47 to the valve 30 is concerned. Without the present valve mechanism, increased pressure in the line 21, represented by the line 122 in FIGURE 2, will result in progressively increasing pressures supplied to the emergency valve 30 as represented by the dotted line 126. The present valve mechanism so functions that upon a slight increase in pressure in the line 21, there will be a slight immediate increase in pressure supplied to the emergency valve 30 as suggested by the line 127. Very quickly, however, there will be a rapid increase in pressure supplied to the emergency valve as represented by the line 128 until the point 129 is reached. Thereafter, there will be a continued increase in pressure supplied to the emergency valve as represented by the line 130, but this pressure increase will be at a slower rate than that which has previously occurred. The increase in pressure as represented by the line 130 continues to the point 131, which coincides with the line 126. At this point, pressures in the lines 21 and 47 reach a 1:1 ratio and from then on during the remainder of the trailer brake operation, pressure increases supplied to the trailer brakes will be as represented by the line 132, the trailer brakes being applied to a degree proportional to the application of the tractor brakes, as is desired.

It will be apparent, therefore that upon operation of the brake pedal substantial and rapid energization of the trailer brake actuators will occur. This is due to the rapid increase in pressure as represented by the line 128 in FIGURE 2. Between the points 129 and 131 the increase in pressure supplied to the relay valve 30 to operate the trailer brake actuators will be more gradual, and the transition between the period of operation represented by the line 130 and that represented by the line 132 will be very smooth and gradual.

When the brake pedal is released, pressure from the chamber 75 cannot be relieved through the chamber 91. Such pressure, however, will be relieved through passage 77, chamber 53, past valve 65 and through port 67 into the chamber 44 and thence through passage 83 and chambers 84 and 76 to the service line 21, which is now connected to the atmosphere. When pressure in the chamber 76 drops to a predetermined point, the spring 111 will return the plunger 89 to its normal upper position to vent the chamber 75 to the atmosphere around the ball valve 102, as previously described.

As previously stated, the effective maximum pressure in the chamber 44 when the valve 113 is closed and the valve 114 is opened will depend upon the loading of the spring 61. The greater the loading of such spring, the greater will be the maximum pressure in the chamber 44, and, conversely, the more lightly the spring 61 is loaded, the lower will be the maximum pressure built up in the chamber 44 before the valve 114 closes. When the trailer is heavily loaded, therefore, the adjusting knob 54 will be turned to screw the plug 51 inwardly to increase the loading of the spring 61. When the trailer is running light, the plug 51 will be screwed out until the knob 54 engages the stop 55. This will provide the minimum loading of the spring 61. The plug 51 may be adjusted to intermediate positions for various loadings of the trailer, as will be apparent.

From the foregoing, it will be apparent that the present system provides for a quick application of the trailer brakes, appreciable application of such brakes taking place ahead of appreciable application of the tractor brakes when a substantial movement of the brake pedal 10 takes place. Thus the dangerous "jackknifing" of the trailer is prevented. It also will be apparent that the mechanism provides novel means, without the use of a hand valve, for snubbing the trailer brakes, it merely being necessary to slightly depress the brake pedal 10 to secure such results. Moreover, for a substantial brake application, the trailer brakes are almost immediately substantially applied, and there is a smooth transition from the application of such boosted pressure to the point where the pressure in the service line takes over the controlling of the relay valve. The highly desirable results provided with the present system are also accomplished with the use of only the two conventional lines leading from the tractor to the trailer, namely the conventional service and emergency lines.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a remote control pressure operated brake system having a control line to control a portion of the brakes of the entire system, a relay device interposed in said control line to divide said control line into a primary control line for transmitting controlling pressures and a secondary control line to transmit pressures regulated by said relay device in response to said controlling pressures, said relay device including means to augment a light pressure impulse in said primary control line to a predetermined pressure in said secondary control line and to boost said predetermined pressure proportionally with an increase in said controlling pressure with a gradually decreasing ratio, said relay device further including means operative when said ratio has been decreased to a predetermined extent for opening said primary control line to direct communication with said secondary control line.

2. In a remote control pressure operated brake system having a control line to control a portion of the brakes of the entire system, a relay device interposed in said control line to divide said control line into a primary control line through which controlling pressures are introduced and a secondary control line to transmit pressures regulated by said relay device in response to said controlling pressures, said relay device comprising a pressure responsive element having at one side thereof a first chamber connected to said primary control line, an inlet chamber in said relay device connected to said secondary control line, pressure operated means connected to be responsive to pressures in said inlet chamber to control said portion of the brakes, means responsive to movement of said pressure responsive element by pressures in said first chamber to admit pressure from a pressure source to said inlet chamber, and means operative when pressure in said inlet chamber increases to a predetermined point for overcoming pressure in said first chamber and to connect the latter directly to said inlet chamber.

3. A system according to claim 2 wherein said pressure responsive element has a second chamber at the other side thereof, said last-named means comprising a bypass connected between said inlet chamber and said second chamber and opening away from said inlet chamber at a predetermined pressure, and a valve device connected to be opened upon movement of said pressure responsive element incident to pressure in said second chamber for opening said first chamber to said inlet chamber.

4. In a remote control pressure operated brake system having a service line to transmit pressure impulses from a source of pressure, means for controlling the admission of pressure impulses to one end of said service line, and remote means responsive to pressure impulses in the other end of said service line to control the application of said brakes, in combination, an auxiliary valve mechanism, a pressure responsive element in said valve mechanism cooperating therewith to form a first and a second chamber at opposite sides of said pressure responsive element, said first chamber being connected to said one end of said control line, an inlet chamber in said valve mechanism connected to supply pressure to said remote means to operate it to connect a pressure source to said brakes, a valve seat between said inlet chamber and said last-named source, an inlet valve normally engaging said seat and operative for controlling communication between said inlet chamber and said last-named source, an outlet valve connected to said inlet valve, means carried by said pressure responsive element and forming a passage between said inlet chamber and said first chamber and one end of which passage forms a seat for said outlet valve and is normally disengaged therefrom whereby admission of pressure to said first chamber moves said pressure responsive element to close said outlet valve and open said inlet valve, a bypass between said inlet chamber and said second chamber, and means controlling the pressure in said inlet chamber at which such pressure will be relieved therefrom through said bypass to said second chamber to move said pressure responsive element against pressure in said first chamber to open said outlet valve.

5. A system according to claim 4 wherein said last-named means comprises a check valve, a spring biasing said check valve to closed position, and means for adjusting the loading of said spring to increase or decrease the pressure in said inlet chamber at which said check valve opens.

6. A system according to claim 4 provided with a check valve carried by said last-named means and opening toward said inlet chamber whereby, upon movement of said pressure responsive element to open said outlet valve, pressure will be released from said second chamber through said bypass to said inlet chamber and through said passage.

7. A system according to claim 4 wherein said last-named means comprises a device including a check valve biased to closed position and opening away from said inlet chamber to release pressure therefrom, and a second check valve carried by said device and opening toward said inlet chamber whereby, when said pressure responsive element moves to open said outlet valve, pressure will be released from said second chamber through said bypass to said inlet chamber and thence to said passage.

8. A mechanism according to claim 4 wherein said last-named means comprises a device having a normally closed check valve movable away from said inlet chamber to release pressure therefrom, a spring biasing said check valve to closed position, and means for adjusting the loading of said spring to predetermine the pressure in said inlet chamber at which said check valve will open, and a second check valve carried by said device and opening toward said inlet chamber to release pressure from said second chamber through said bypass to said inlet chamber and thence to said passage when said pressure responsive element moves to open said outlet valve.

9. In a remote control pressure operated brake system having a service line to transmit pressure impulses from a source of pressure, means for controlling the admission of pressure impulses to one end of said service line, a relay valve responsive to pressure impulses in the other end of said service line to control the application of said brakes, in combination, an auxiliary valve mechanism, a pressure responsive element in said valve mechanism cooperating therewith to form a first and a second chamber at opposite sides of said pressure responsive element, said first chamber being connected to said one end of said service line, an inlet chamber in said valve mechanism connected to said other end of said service line to transmit pressure impulses to said relay valve, a normally closed inlet valve controlling communication between said inlet chamber and a pressure source, an outlet valve connected to said inlet valve to move therewith, a body carried by said pressure responsive element and forming a passage between said inlet chamber and said first chamber and one end of which passage forms a seat engageable with said outlet valve to close it and open said inlet valve upon admission of pressure through said one end of said service line to said first chamber to move said pressure responsive element, a bypass between said inlet chamber and said second chamber, means controlling the pressure in said inlet chamber at which such pressure will be relieved from said inlet chamber through said bypass to said second chamber to move said pressure responsive element against pressure in said first chamber to open said outlet valve, and means formed in part by said body for relieving pressure from said second chamber when pressure above a predetermined point is relieved from said first chamber.

10. A system according to claim 9 provided with means for rendering said last-named means ineffective for relieving pressure from said second chamber when pressure in said first chamber is above a predetermined point.

11. In a remote control pressure operated brake system having a service line to transmit pressure impulses from a source of pressure, means for controlling the admission of pressure impulses to one end of said service line, a relay valve responsive to pressure impulses in the other end of said service line to control the application of said brakes, in combination, an auxiliary valve mechanism having a body, a diaphragm in said body cooperating therewith to form a first and a second chamber at opposite sides of said diaphragm, siad first chamber being connected to said one end of said service line, an inlet chamber in said body connected to the other end of said service line to transmit pressure impulses to said relay valve, means providing a pressure chamber in axial alinement with said inlet chamber, a valve seat between said pressure and inlet chambers, an inlet valve in said pressure chamber normally engaging said seat, an outlet valve in said inlet chamber connected to said inlet valve to move therewith, a piston carried by said diaphragm, said body having a cylinder in which said piston operates, said body having a wall between said second chamber and said inlet chamber provided with an opening, said piston having an axial stem sliding through said opening in sealed relation thereto, said piston having passage means extending from said first chamber to the end of said stem in said inlet chamber and terminating in a valve seat engageable with said outlet valve to close the latter and open said inlet valve when pressure in said first chamber increases, a bypass connected between said inlet chamber and said second chamber, and a check valve in said bypass biased to closed position and adapted to open away from said inlet chamber to release pressure therefrom into said second chamber to oppose movement of said diaphragm by pressure in said first chamber.

12. A system according to claim 11 provided with a second check valve in said bypass providing for the flow of fluid from said second chamber to said inlet chamber when pressures in the latter chamber drop incident to movement of said diaphragm to open said outlet valve.

13. A system according to claim 11 provided with a spring biasing said check valve to closed position, and means for adjusting the loading of said spring to predetermine the pressure in said inlet chamber at which said check valve will open and release pressure through said bypass into said second chamber.

14. A system according to claim 11 provided with a spring biasing said check valve to closed position, means for adjusting the loading of said spring to predetermine the pressure in said inlet chamber at which said check valve will open and release pressure through said bypass into said second chamber, and a second check valve in said bypass opening away from said second chamber whereby, when said outlet valve is opened incident to movement of said diaphragm by pressure in said second chamber, the latter pressure will be relieved through said second check valve into said inlet chamber.

15. In a remote control pressure operated brake system having a service line to transmit pressure impulses from a source of pressure, means for controlling the admission of pressure impulses to one end of said service line, a relay valve responsive to pressure impulses in the other end of said service line to control the application of said brakes, in combination, an auxiliary valve mechanism having a body, a diaphragm in said body cooperating therewith to form a first and a second chamber at opposite sides of said diaphragm, said first chamber being connected to said one end of said service line, an inlet chamber in said body connected to the other end of said service line to transmit pressure impulses to said relay valve, means providing a pressure chamber in axial alinement with said inlet chamber, a valve seat between said pressure and inlet chambers, an inlet valve in said pressure chamber normally engaging said seat, an outlet valve in said inlet chamber connected to said inlet valve to move therewith, a piston carried by said diaphragm, said body having a cylinder in which said piston operates, said body having a wall between said second chamber and said inlet chamber provided with an opening, said piston having an axial stem sliding through said opening in sealed relation thereto, said piston having passage means extending from said first chamber to the end of said stem in said inlet chamber and terminating in a valve seat engageable with said outlet valve to close the latter and open said inlet valve when pressure in said first chamber increases, a bypass connected between said inlet chamber and said second chamber, a check valve in said bypass biased to closed position and adapted to open away from said inlet chamber to release pressure therefrom into said second chamber to oppose movement of said diaphragm by pressure in said first chamber, the end of said cylinder remote from said first chamber being open to the atmosphere, an air passage in said piston, a valve adapted to close such passage, a stem carried by said body and engageable with said last-named valve to maintain it in open position when said piston is in a normal position, a cut-off valve in said piston, and a plunger in said piston having one end exposed to pressure in said first chamber, said plunger having a normal position and cooperating with said piston to provide a passage between said second chamber and the air passage in said piston, said plunger being biased to said normal position and being movable by predetermined pressure in said first chamber to engage said cut-off valve to cut off communication between said second chamber and the air passage in said piston.

16. A tractor-trailer brake system comprising tractor brake actuators, a pedal operable control valve having a line connected to said tractor brake actuators to supply pressure thereto upon operation of said control valve, a service line connected at one end to said pressure line, a relay valve connected to the other end of said service line and having connection with said trailer brake actuators to supply pressure thereto upon operation of said relay valve by increased pressures in said other end of said service line, an auxiliary valve mechanism in said service line, a diaphragm in said valve mechanism cooperating therewith to form a first and a second chamber at opposite sides of said diaphragm, said first chamber being connected to said one end of said service line, an inlet chamber in said valve mechanism connected to said other end of said service line, a normally closed inlet valve controlling communication between said inlet chamber and a pressure source, an outlet valve connected to said inlet valve to move therewith, a body carried by said diaphragm and forming a passage between said inlet chamber and said first chamber and one end of which passage terminates in said inlet chamber and forms a seat engageable with said outlet valve to close it and open said inlet valve upon admission of pressure through said one end of said service line to said first chamber to move said diaphragm, a bypass between said inlet chamber and said second chamber, and means controlling the pressure in said inlet chamber at which such pressure will be relieved from said inlet chamber through said bypass to said second chamber to move said diaphragm against pressure in said first chamber to open said outlet valve.

17. A system according to claim 16 wherein said last-named means comprises a check valve opening away from said inlet chamber, and a spring opposing opening movement of said check valve.

18. A system according to claim 16 provided with a check valve in said bypass opening away from said second chamber to relieve pressures therefrom into said inlet chamber when said diaphragm moves by pressure in said second chamber to open said outlet valve.

19. A system according to claim 16 wherein said last-named means comprises a first check valve opening away from said inlet chamber, a spring biasing said first check valve to closed position, means for adjusting the loading of said spring to predetermine the pressure in said inlet chamber at which said first check valve will open, and a second check valve in said bypass opening away from said second chamber to relieve pressures therefrom into said inlet chamber when said outlet valve is opened by movement of said diaphragm by pressure in said second chamber.

References Cited in the file of this patent
UNITED STATES PATENTS

| | | |
|---|---|---|
| 2,215,172 | Christensen | Sept. 17, 1940 |
| 2,429,194 | Price | Oct. 14, 1947 |
| 2,941,844 | Stelzer | June 21, 1960 |